(12) United States Patent
Drangula et al.

(10) Patent No.: US 10,951,499 B2
(45) Date of Patent: Mar. 16, 2021

(54) TRACKING CHANGES IN NETWORK CONFIGURATIONS

(71) Applicant: Gigamon Inc., Santa Clara, CA (US)

(72) Inventors: Dennis Drangula, Sparta, NJ (US); Veniamin Bourakov, Fremont, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

(21) Appl. No.: 16/459,453

(22) Filed: Jul. 1, 2019

(65) Prior Publication Data

US 2019/0327155 A1 Oct. 24, 2019

Related U.S. Application Data

(63) Continuation of application No. 14/588,850, filed on Jan. 2, 2015, now Pat. No. 10,341,203.

(51) Int. Cl.
*H04L 12/26* (2006.01)
*H04L 12/24* (2006.01)

(52) U.S. Cl.
CPC ........ *H04L 43/062* (2013.01); *H04L 41/0816* (2013.01); *H04L 43/12* (2013.01)

(58) Field of Classification Search
CPC .... H04L 43/062; H04L 41/0816; H04L 43/12
See application file for complete search history.

(56) References Cited

U.S. PATENT DOCUMENTS

| | | | |
|---|---|---|---|
| 6,088,803 A | 7/2000 | Tso et al. | |
| 6,539,425 B1 | 3/2003 | Stevens et al. | |
| 6,608,631 B1 | 8/2003 | Milliron | |
| 6,771,673 B1 | 8/2004 | Baum et al. | |
| 6,880,111 B2 | 4/2005 | Fanning | |
| 7,428,583 B1 | 9/2008 | Lortz et al. | |
| 7,552,238 B2 | 6/2009 | Gulland | |
| 7,583,677 B1 | 9/2009 | Ma et al. | |
| 7,962,545 B2 | 6/2011 | Knauerhase et al. | |
| 8,345,568 B2 | 1/2013 | Krzanowski | |
| 8,380,819 B2 | 2/2013 | Ankaiah et al. | |
| 8,599,854 B2 | 12/2013 | Srinivasan et al. | |

(Continued)

FOREIGN PATENT DOCUMENTS

WO 2012158241 A1 11/2012

OTHER PUBLICATIONS

NPL Search (Google Scholar) (Year: 2020).*

(Continued)

*Primary Examiner* — Samson B Lemma
*Assistant Examiner* — Richard W Cruz-Franqui
(74) *Attorney, Agent, or Firm* — Perkins Coie LLP

(57) ABSTRACT

A method performed by a network device includes: receiving an input indicating a change in an auxiliary network from a first configuration to a second configuration, wherein the auxiliary network is configured to obtain copies of packets from a traffic production network; determining a first network policy, wherein the first network policy is for application in the auxiliary network when the auxiliary network is in the first configuration; and determining a second network policy by the network device based on the received input and the first network policy, wherein the second network policy is for application in the auxiliary network when the auxiliary network is in the second configuration.

18 Claims, 7 Drawing Sheets

(56) References Cited

U.S. PATENT DOCUMENTS

| | | | |
|---|---|---|---|
| 8,756,653 B2 | 6/2014 | Jacobson | |
| 8,891,543 B1* | 11/2014 | Tripathi | H04L 47/35 370/412 |
| 9,053,000 B1 | 6/2015 | Lam et al. | |
| 9,088,508 B1 | 7/2015 | Caputo, II et al. | |
| 10,341,203 B2* | 7/2019 | Drangula | H04L 43/062 |
| 2003/0039210 A1* | 2/2003 | Jin | H04L 47/70 370/229 |
| 2004/0095922 A1* | 5/2004 | Sasagawa | H04L 45/00 370/351 |
| 2006/0280207 A1* | 12/2006 | Guarini | H04L 43/12 370/524 |
| 2007/0226775 A1 | 9/2007 | Andreasen et al. | |
| 2008/0298353 A1 | 12/2008 | Zhu et al. | |
| 2009/0031307 A1 | 1/2009 | Chodroff et al. | |
| 2009/0129399 A1 | 5/2009 | Malysh et al. | |
| 2009/0150883 A1 | 6/2009 | Tripathi et al. | |
| 2009/0161547 A1 | 6/2009 | Riddle et al. | |
| 2011/0099258 A1 | 4/2011 | Ayachitula et al. | |
| 2011/0128975 A1* | 6/2011 | Kang | H04L 69/22 370/477 |
| 2013/0064243 A1* | 3/2013 | Akiyoshi | H04L 45/745 370/389 |
| 2013/0259037 A1 | 10/2013 | Natarajan et al. | |
| 2013/0290695 A1 | 10/2013 | Ogawa | |
| 2013/0304616 A1 | 11/2013 | Raleigh et al. | |
| 2014/0040975 A1 | 2/2014 | Raleigh et al. | |
| 2014/0120940 A1 | 5/2014 | Ren et al. | |
| 2014/0122672 A1 | 5/2014 | Chen et al. | |
| 2014/0136676 A1 | 5/2014 | Chow et al. | |
| 2014/0233429 A1* | 8/2014 | Farkas | H04L 45/18 370/255 |
| 2014/0254360 A1 | 9/2014 | Lee et al. | |
| 2014/0280846 A1* | 9/2014 | Gourlay | H04L 63/0876 709/223 |
| 2014/0280857 A1 | 9/2014 | Yang et al. | |
| 2015/0113132 A1 | 4/2015 | Srinivas et al. | |
| 2015/0138953 A1* | 5/2015 | Lanzone | H04J 3/14 370/225 |
| 2015/0188760 A1* | 7/2015 | Anumala | H04L 41/083 370/254 |
| 2015/0200808 A1* | 7/2015 | Gourlay | H04L 45/74 709/225 |
| 2015/0207720 A1 | 7/2015 | Dagum et al. | |
| 2015/0350095 A1 | 12/2015 | Raney | |
| 2015/0358358 A1 | 12/2015 | Karhade | |
| 2016/0087854 A1 | 3/2016 | Jayanti Venkata et al. | |
| 2016/0197936 A1* | 7/2016 | Drangula | H04L 43/062 726/1 |
| 2016/0261611 A1 | 9/2016 | Heilig | |
| 2019/0327155 A1* | 10/2019 | Drangula | H04L 41/0816 |

OTHER PUBLICATIONS

Non-Final Office Action dated Mar. 1, 2017, for U.S. Appl. No. 14/588,850 of Drangula et al. filed Jan. 2, 2015.
Final Office Action dated Oct. 6, 2016, for U.S. Appl. No. 14/588,850 of Drangula et al. filed Jan. 2, 2015.
Non-Final Office Action dated Feb. 25, 2016, for U.S. Appl. No. 14/588,850 of Drangula et al. filed Jan. 2, 2015.
Advisory Office Action dated Jan. 31, 2017, for U.S. Appl. No. 14/588,850 of Drangula et al. filed Jan. 2, 2015.
Final Office Action dated Aug. 24, 2017, for U.S. Appl. No. 14/588,850 of Drangula et al. filed Jan. 2, 2015.
Advisory Office Action dated Nov. 15, 2017, for U.S. Appl. No. 14/588,850 of Drangula et al. filed Jan. 2, 2015.
Non-Final Office Action dated May 1, 2018, for U.S. Appl. No. 14/588,850 of Drangula et al. filed Jan. 2, 2015.
Final Office Action dated Nov. 19, 2018, for U.S. Appl. No. 14/588,850 of Drangula et al. filed Jan. 2, 2015.

* cited by examiner

_(1)_

TRACKING CHANGES IN NETWORK CONFIGURATIONS

CROSS-REFERENCE TO RELATED APPLICATION

This application is a continuation of U.S. patent application Ser. No. 14/588,850, filed Jan. 2, 2015, which issued as U.S. Pat. No. 10,341,203, which is incorporated by reference herein in its entirety.

FIELD

This application relates generally to network devices, and more specifically, to systems and methods for tracking policy in a network that includes virtual devices.

BACKGROUND

An embodiment described herein relates to an auxiliary network that is configured to obtain copies of packets from a traffic production network. Such auxiliary network includes one or more nodes for processing the copies of packets in an out-of-band configuration so that copies of the packets can be forwarded to some end tools. Accordingly, the auxiliary network is not a part of the traffic production network.

In some cases, the auxiliary network may change. For example, one node in the auxiliary network may be a virtual machine implemented on a host, and such virtual machine may be moved to another host. As another example, one node in the auxiliary network may be a physical device, and the physical device may be replaced with another physical device located elsewhere, or may be moved to another geographical location. Also, the configuration of one or more nodes in the auxiliary network may change.

An embodiment described herein provides a device and method for detecting a change in the auxiliary network, and configure one or more network policies governing the behavior of one or more nodes in the auxiliary network based on the detected change.

SUMMARY

A method performed by a network device includes: receiving an input indicating a change in an auxiliary network from a first configuration to a second configuration, wherein the auxiliary network is configured to obtain copies of packets from a traffic production network; determining a first network policy, wherein the first network policy is for application in the auxiliary network when the auxiliary network is in the first configuration; and determining a second network policy by the network device based on the received input and the first network policy, wherein the second network policy is for application in the auxiliary network when the auxiliary network is in the second configuration.

Optionally, the first network policy prescribes the copies of the packets to be forwarded to one or more instrument ports for transmission to one or more network monitoring instruments.

Optionally, the act of determining the second network policy is performed by the network device automatically in response to the received input.

Optionally, the second network policy is for replacing the first network policy, and wherein the second network policy is configured to achieve an objective previously desired to be achieved by the first network policy.

Optionally, the input is received from a VCENTER.

Optionally, the input is received from a controller that is communicatively coupled to the network device.

Optionally, the network device comprises a fabric manager configured to manage one or more service nodes in the auxiliary network.

Optionally, the auxiliary network comprises a virtual machine, and wherein the change in the auxiliary network comprises a movement of the virtual machine from a first host to a second host.

Optionally, the auxiliary network comprises a vNIC, and wherein the change in the auxiliary network comprises a movement of the vNIC.

Optionally, the change in the auxiliary network comprises a change in a configuration of a physical switch device in the auxiliary network.

Optionally, the second network policy is the same as the first network policy.

Optionally, the network device is implemented in a computer, a laptop, a server, a tablet, an iPad, or a phone.

Optionally, the network device comprises multiple appliances that are stacked together or that are communicatively coupled.

Optionally, the method further includes deploying the second network policy for application in the auxiliary network.

A network device includes: a communication component for receiving an input indicating a change in an auxiliary network from a first configuration to a second configuration, wherein the auxiliary network is configured to obtain copies of packets from a traffic production network; and a processing unit coupled to the communication component, wherein the processing unit is configured for determining a first network policy, wherein the first network policy is for application in the auxiliary network when the auxiliary network is in the first configuration; and determining a second network policy by the network device based on the received input and the first network policy, wherein the second network policy is for application in the auxiliary network when the auxiliary network is in the second configuration.

Optionally, the first network policy prescribes the copies of the packets to be forwarded to one or more instrument ports for transmission to one or more network monitoring instruments.

Optionally, the processing unit is configured to determine the second network policy automatically in response to the received input.

Optionally, the second network policy is for replacing the first network policy, and wherein the second network policy is configured to achieve an objective previously desired to be achieved by the first network policy.

Optionally, the communication component is configured to receive the input from a VCENTER.

Optionally, the communication component is configured to receive the input from a controller that is communicatively coupled to the network device.

Optionally, the network device comprises a fabric manager configured to manage one or more service nodes in the auxiliary network.

Optionally, the auxiliary network comprises a virtual machine, and wherein the change in the auxiliary network comprises a movement of the virtual machine from a first host to a second host.

Optionally, the auxiliary network comprises a vNIC, and wherein the change in the auxiliary network comprises a movement of the vNIC.

Optionally, the change in the auxiliary network comprises a change in a configuration of a physical switch device in the auxiliary network.

Optionally, the second network policy is the same as the first network policy.

Optionally, the network device is implemented in a computer, a laptop, a server, a tablet, an iPad, or a phone.

Optionally, the network device comprises multiple appliances that are stacked together or that are communicatively coupled.

Optionally, the processing unit is further configure to deploy the second network policy for application in the auxiliary network.

A computer product includes a non-transitory medium storing a set of instruction, an execution of which by a processing unit in a network device causes a method to be performed, the method comprising: receiving an input indicating a change in an auxiliary network from a first configuration to a second configuration, wherein the auxiliary network is configured to obtain copies of packets from a traffic production network; determining a first network policy, wherein the first network policy is for application in the auxiliary network when the auxiliary network is in the first configuration; and determining a second network policy based on the received input and the first network policy, wherein the second network policy is for application in the auxiliary network when the auxiliary network is in the second configuration.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DETAILED DESCRIPTION

Figure 1A:
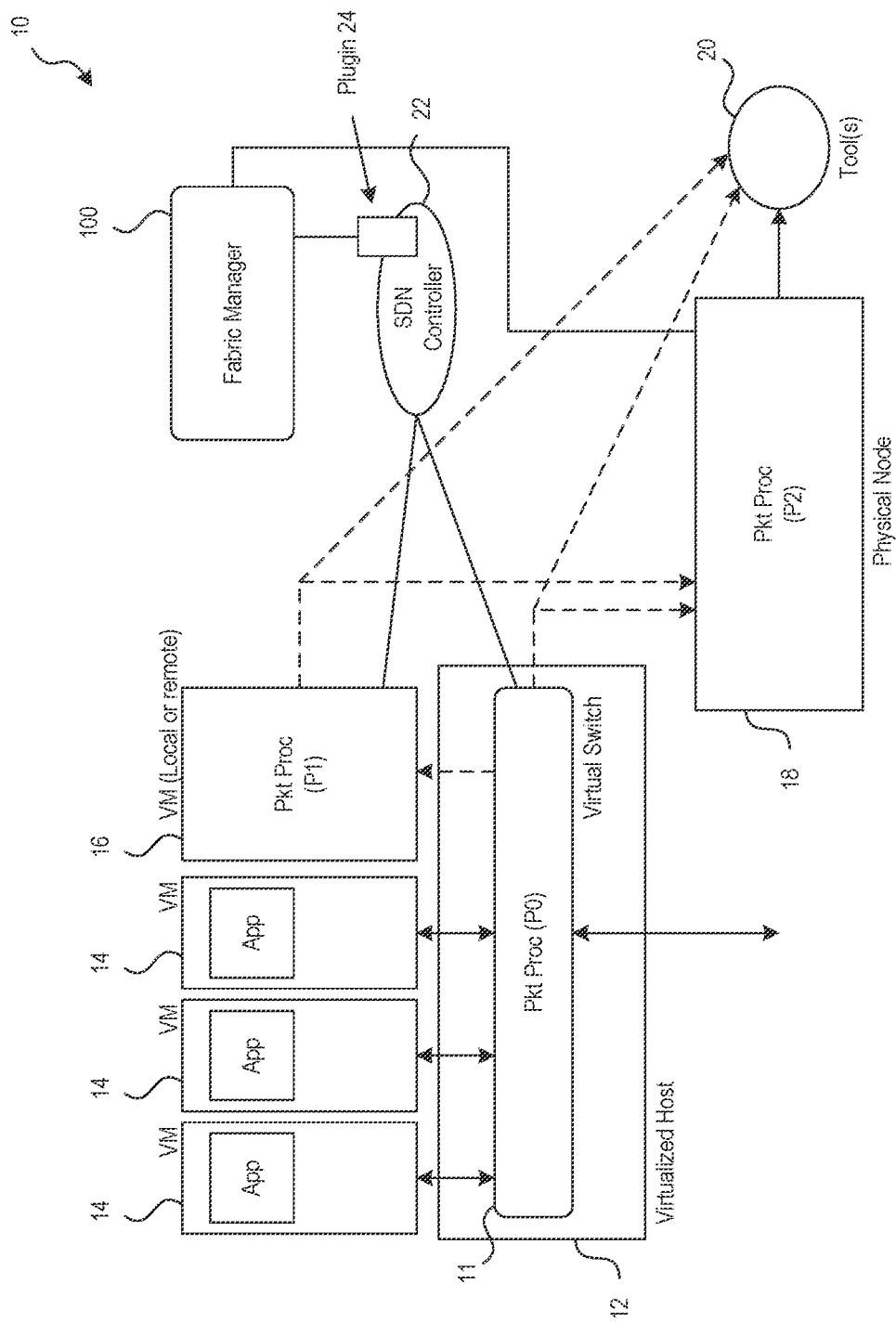
FIG. 1A illustrates an example of an auxiliary network configured to obtain copies from a traffic production network.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

An embodiment described herein provides a device and/or a method for tracking a change in a configuration of an auxiliary network that includes one or more virtual devices. The auxiliary network may have one or more network policy that controls the behavior of one or more nodes in the auxiliary network. The device and method described herein detect a change in the configuration of the auxiliary network, and configure one or more network policy based on the detected change. For example, a node in the auxiliary network may be a virtual machine implemented at a first host, and such a node may be controlled based on a network policy. In such cases, if the virtual machine is switched to a second host, the device described herein will detect such change, and will determine a network policy for the virtual machine at the second host. For example, the network policy for the virtual machine at the second host may be determined so that the packets previously processed by the virtual machine at the first host will be processed the same way by the virtual machine at the second host.

Auxiliary Network for Providing Visibility Fabric

FIG. 1A illustrates a network 10 in accordance with some embodiments. The network 10 is an auxiliary network that is configured to obtain copies of packets from a traffic production network. As shown in the figure, the auxiliary network 10 includes a virtual switch 11 implemented in a host 12, and a virtual machine (VM) 16 supported by the host 12. In the illustrated example, the host 12 that implements the virtual switch 11 is also the same host that supports the VM 16. In other examples, there may be one host 12 implementing the virtual switch 11, and another host 12 supporting the VM 16. As shown in the figure, the host 12 also supports multiple virtual machines VMs 14, but the VMs 14 are not parts of the auxiliary network. The network 10 also includes a physical switch device 18 communicatively coupled to the host 12 and/or the VM 16. The switch device 18 is configured to communicate with one or more tools 20. In some cases, each tool 20 may be a network monitoring tool configured to analyze packets for network monitoring. In other cases, each tool 20 may be any of other types of packet processing tools. In further cases, each tool 20 may be a medium, such as a storage device, a database, a server, etc. The VMs 14 may be configured to run different applications to process packets and/or to perform other types of tasks. The VM 16 is configured to perform packet processing to pass packets downstream for analysis and/or storage by the tool(s) 20. As shown in the figure, a Software Defined Networking (SDN) controller 22 may be configured to control the behavior of the virtual switch 11 and the VM 16.

The virtual switch 11, the VM 16, and the switch device 18 are parts of an auxiliary network configured to obtain packets (e.g., copies of packets) from a production network, and to pass the packets to the tool(s) 20 for analysis and/or storage. Thus, the virtual switch 11, the VM 16, and the switch device 18 are not parts of the traffic production network. In some embodiments, the virtual switch 11, the VM 16, and the switch device 18 are respective service nodes P0, P1, P2, each offering varying levels of capability, as follow:

P0 Node Host-level (advanced) virtual switch 11 (lowest capability)
P1 Node Virtual monitoring appliance 16 (intermediate capability)
P2 Node Physical monitoring appliance 18 (highest capability)

In particular, each service node is capable of providing some degree of packet filtering, packet manipulating, and packet forwarding services. The P0 service node provides the lowest degree of packet filtering, packet manipulating, and packet forwarding services. The P1 service node provides an intermediate degree of packet filtering, packet manipulating, and packet forwarding services. The P2 service node provides the highest degree of packet filtering, packet manipulating, and packet forwarding services. In other embodiments, the functionalities and level of capabilities of the P0 node, P1 node, and P2 node may be different from the examples described.

The P0 nodes straddle the boundary between a production network (where normal network traffic, such as VM traffic, is flowing) and the auxiliary network (Software Defined Visibility Fabric). Their use helps eliminate unwanted traffic closer to the VMs being monitored, thereby freeing up precious bandwidth and reducing processing cycles consumed by other nodes. The P1 nodes may aggregate traffic originating from several P0 and P1 nodes, and offer some advanced packet manipulation capabilities. Similarly, P2 nodes may aggregate traffic from several P0, P1 and P2 nodes and provide the highest levels of capacity, performance and packet manipulation capabilities. In some cases, the auxiliary network may also include P3 node representing a tool 20.

The switch device 18 is configured to receive packets, and pass the packets to one or more tools 20. In some cases, the switch device 18 may be configured to receive normal packets (e.g., packets not from a virtualized network), as well as virtualized packets (e.g., packets with tunnel format that includes encapsulation of the original packets resulted from virtualization technology). In other cases, the switch device 18 may be configured to receive only virtualized packets. Also, in some cases, the switch device 18 may be any switch module that provides packet transmission in accordance with a pre-determined transmission scheme.

In some embodiments, the switch device 18 may be user-configurable such that packets may be transmitted in a one-to-one configuration (i.e., from one network port to an instrument port). As used in this specification, the term "instrument port" refers to any port that is configured to transmit packets to a tool (e.g., tool 20), wherein the tool may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the tool may be a pass-through device (i.e., it can receive packets, and transmit the packets back to the switch device 18 after the packets have been processed), such as an intrusion prevention system. In other embodiments, the switch device 18 may be configured such that the packets may be transmitted in a one-to-many configuration (i.e., from one network port to multiple instrument ports). In other embodiments, the switch device 18 may be configured such that the packets may be transmitted in a many-to-many configuration (i.e., from multiple network ports to multiple instrument ports). In further embodiments, the switch device 18 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the switch device 18 so that the packets (or certain types of packets) are routed according to any one of these configurations. Also, in some embodiments, the switch device 18 may be an "out-of-band" network device, which is configured to obtain packets and pass them to a tool or to a network that is different from that associated with the original intended destination of the packets. Thus, the switch device 18 is not a part of the underlying network that performs packet production.

As shown in the figure, a fabric manager 100 is configured to communicate with the SDN controller 22 and the switch device 18. The fabric manager 100 is configured to control the behavior of one or more service nodes P0, P1, P2. In some cases, the fabric manager 100 may integrate with the SDN controller 22 through a plug-in 24. For example, in some cases, in a SDN enabled datacenter supporting virtualized workloads, the host-level virtual switches 11 may be under the control of the SDN controller 22. Since these switches 11 serve as service nodes in the SDN fabric, the fabric manager 100 may be integrated with the SDN controller 22 using the plug-in 24. The upper-half of the plug-in 24 may export an API that is specifically designed to satisfy the needs of the fabric manager 100. The lower-half of the plug-in 24 may be controller specific (e.g., different lower-halves of the plug-in 24 may be implemented for different controllers). In such an environment, it is possible for the fabric manager 100 to also manage the VMs 16 and the switch devices 18 using the SDN controller 22, provided they are compatible with the controller's 22 Control-Data-Plane-Interface. If not, the fabric manager 100 may directly manage the VMs 16 and the switch devices 18. In other cases, the plug-in 24 may not be needed.

Although not shown, in some cases, the auxiliary network 10 may also include one or more virtual network interface cards (vNICs) used by one or more VM(s) to provide virtual network interface(s).

Figure 1B:
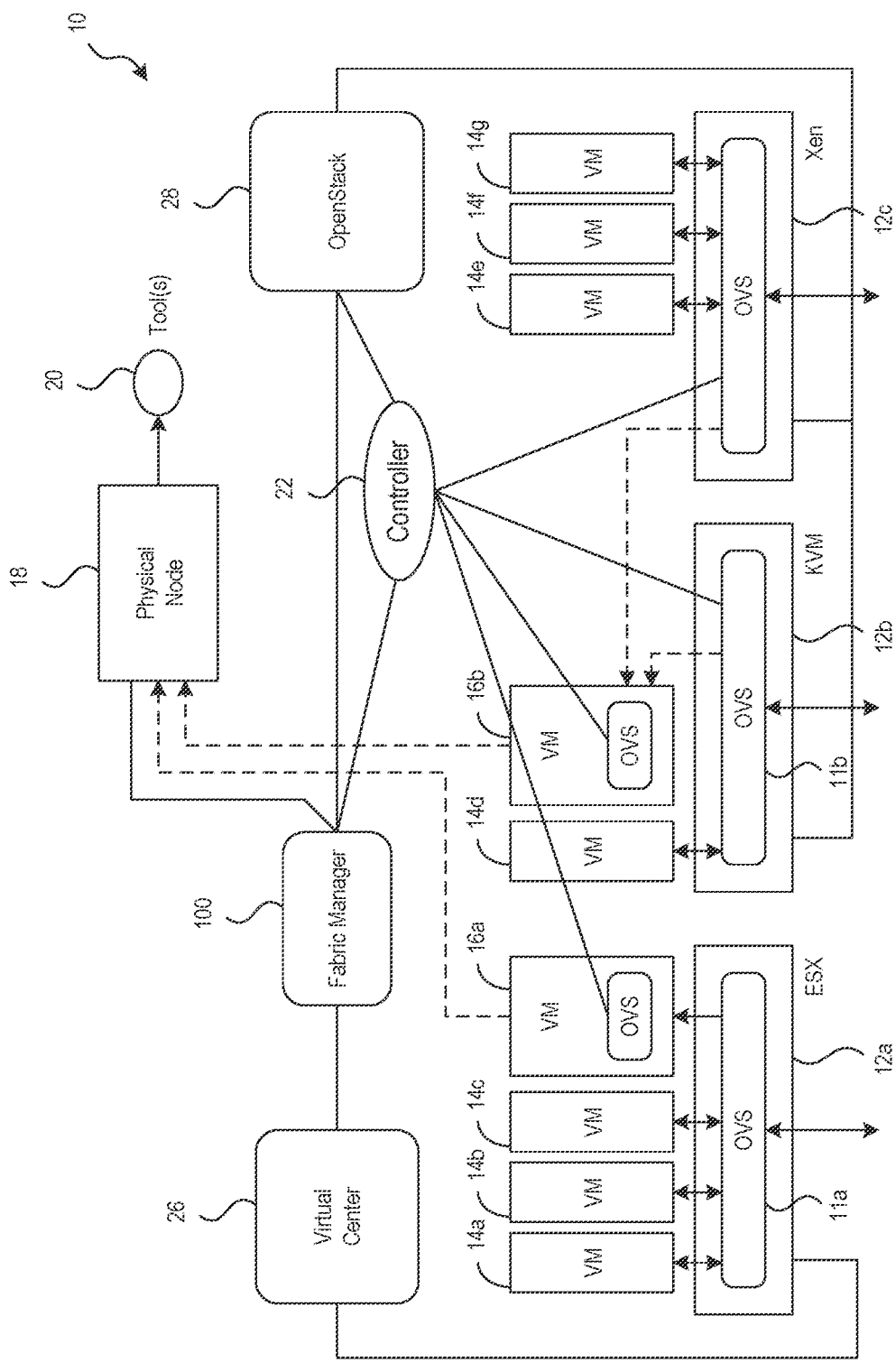
FIG. 1B illustrates another example of an auxiliary network configured to obtain copies from a traffic production network.

It should be noted that the auxiliary network 10 is not limited to the example illustrated in FIG. 1A, and that the auxiliary network 10 may have other configurations in other examples. For example, as shown in FIG. 1B, the auxiliary network 10 may include multiple virtual switches 11 (e.g., 11a, 11b) at multiple respective hosts 12 (e.g., 12a, 12b). As shown in the figure, the host 12a supports VMs 14a-14c, the host 12b supports VM 14d, and the host 12c supports VMs 14e-14g. However, the VMs 14 are not parts of the auxiliary network. The network 10 may also include multiple VMs 16a, 16b. The VM 16a is associated with the host 12a, and the VM 16b is associated with the host 12b. Although one switch device 18 is shown, in other examples, there may be multiple network devices 18, each of which configured to communicate with one or more tools 20. In such cases, the fabric manager 100 may be configured to communicate with the multiple network devices 18.

FIG. 1B shows two examples of VM Management Layers, one being VCENTER 26 and the other being OpenStack 28. Although only one 26 and one openstack 28 are shown, in other examples, there may be multiple VCENTER 26 and/or multiple openstacks 28. As shown in FIG. 1B, there is a SDN controller 22, which communicates with various components in the network 10. The SDN controller 22 may communicate with virtual switch(es) 11 implemented at one or more of the hosts 12, either directly, or indirectly through the VCENTER 26 and/or the openstack 28. The SDN controller 22 may also communicate with the VMs 16a, 16b.

Switch Device

As discussed, the auxiliary network 10 may include one or more switch devices 18 that are configured to pass copies of packets to one or more tools.

Figure 2:
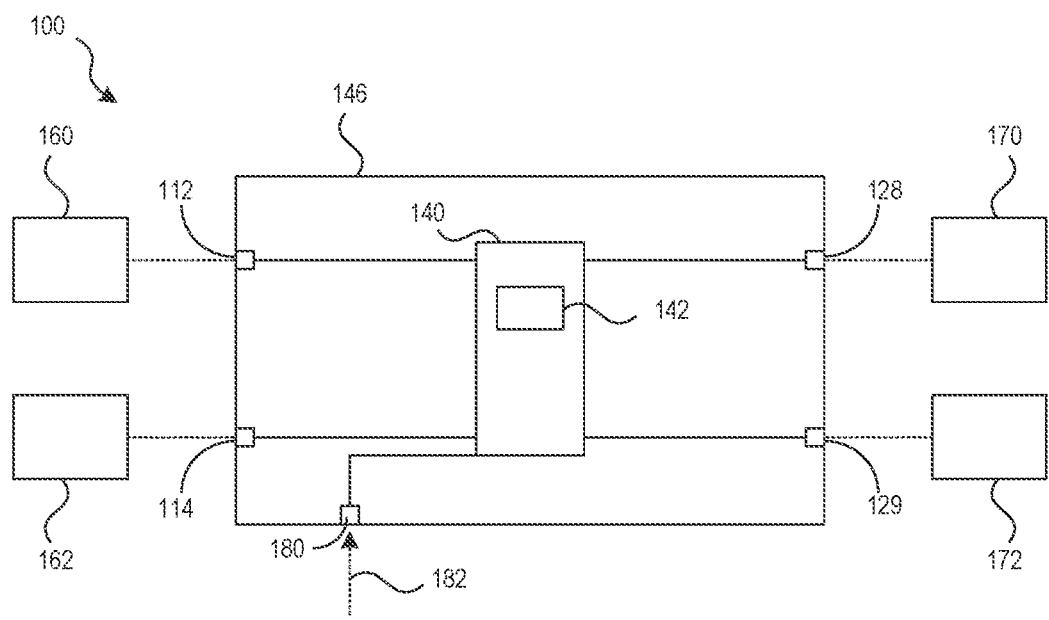
FIG. 2 illustrates a network switch device in accordance with some embodiments.

FIG. 2 illustrates a switch device 100 in accordance with some embodiments. The switch device 100 may be an example of the switch device 18 described with reference to FIG. 1A/1B. The switch device 100 includes a first network port 112, a second network port 114, a first instrument port 128, and a second instrument port 129. The switch device 100 also includes an integrated circuit 140 with a processing unit 142, and a housing 146 for containing the integrated circuit 140 and the integrated circuit 140. In the illustrated embodiments, the switch device 100 also includes other components, such as a Network PHY (not shown) coupled to each of the respective ports 112, 114, wherein the Network PHYs may be considered to be parts of the integrated circuit 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the switch device 100 may include an optical transceiver, or a SERDES, etc. The housing 146 allows the switch device 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments, the switch device 100 may include more than two network ports. Also, although two instrument ports 128, 129 are shown, in other embodiments, the switch device 100 may include only one instrument port, or more than two instrument ports. In addition, in some cases, the switch device 100 may not include any instrument ports for communication with network monitoring instruments. Furthermore, in some cases, the instrument ports 128, 129 may be configured to communicate with one or more instruments. The one or more instruments may be one or more network monitoring instruments. In other cases, the one or more instruments may be one or more non-transitory media, such as one or more storage devices, one or more databases, one or more servers, etc.

During use, the first network port 112 of the switch device 100 is communicatively coupled (e.g., via a network, such as the Internet) to a first node 160, and the second network port 114 is communicatively coupled (e.g., via a network, such as the Internet) to a second node 162. The switch device 100 is configured to receive packets from nodes 160, 162 via the network ports 112, 114. In other cases, there may be only one network port (e.g., port 112). It should be noted that node 160/162 may represent a tap point or a device from which tapped packets are obtained. Also, during use, the instrument ports 128, 129 of the device 100 are communicatively coupled to respective instruments 170, 172. The instruments 170, 172 may be directly coupled to the switch device 100, or communicatively coupled to the switch device 100 through the network (e.g., Internet). In some cases, the switch device 100 is provided as a single unit that allows the device 100 to be deployed at a single point along a communication path.

In some embodiments, one or more of the network ports 112, 114 may be configured to receive normal packets (e.g., packets not from a virtualized network), as well as virtualized packets (e.g., packets with tunnel format that includes encapsulation of the original packets resulted from virtualization technology). In other embodiments, one or more the network ports 112, 114 may be configured to receive only non-virtualized packets. In further embodiments, one or more the network ports 112, 114 may be configured to receive only virtualized packets.

In one or more embodiments, the integrated circuit 140 may be any switch module that provides packet transmission in accordance with a pre-determined transmission scheme. In some embodiments, the integrated circuit 140 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, a database, etc., or the instrument may be a pass-through device (i.e., it can receive packets, and transmit the packets back to the device 100 after the packets have been processed), such as an intrusion prevention system.

In other embodiments, the integrated circuit 140 may be configured such that the packets may be transmitted in a one-to-many configuration (i.e., from one network port to multiple instrument ports).

In other embodiments, the integrated circuit 140 may be configured such that the packets may be transmitted in a many-to-many configuration (i.e., from multiple network ports to multiple instrument ports).

In further embodiments, the integrated circuit 140 may be configured such that the packets may be transmitted in a many-to-one configuration (i.e., from multiple network ports to one instrument port).

In some embodiments, the one-to-one, one-to-many, many-to-many, and many-to-one configurations are all available for allowing a user to selectively configure the switch device 100 so that the packets (or certain types of packets) are routed according to any one of these configurations. In some embodiments, the packet movement configuration is predetermined such that when the switch device 100 receives the packets, the switch device 100 will automatically forward the packets to the ports based on the predetermined packet movement configuration (e.g., one-to-one, one-to-many, many-to-many, and many-to-one). Also, in some embodiments, the forwarding of the packets to one or more instrument port(s) may be based on an analysis of the packets (e.g., analysis of header information in the packets) received by the switch device 100.

In accordance with some embodiments, the integrated circuit 140 may have the functionalities of a conventional packet switch except that it provides visibility into various parts of a network. Thus, embodiments of the integrated circuit 140 may operate like a conventional managed packet switch, but providing packet monitoring function. This is accomplished by configuring the integrated circuit 140 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the integrated circuit 140 may be an "out-of-band" network switch, which is configured to obtain packets and pass them to an instrument or to a network that is different from that associated with the original intended destination of the packets.

Also, the term "out-of-band" device/switch refers to a device that is not involved in a transmission of a packet (that is transmitted from node 1 and intended for reception by node 2) to the intended receiving node 2. In some cases, a device may be both an in-band device and an out-of-band device with respect to processing different packets. For example, the switch device 100 may be an in-band device if it receives a packet (intended for transmission from node 1 to node 2) from a network, and passes the packet back to the network (e.g., after the packet has been processed by a pass-through monitoring tool) for transmission downstream to the node 2. The same switch device 100 may also be an out-of-band device if it receives another packet from the network, and does not pass the packet back to the network for transmission to the intended receiving node.

It should be noted that the integrated circuit 140 that may be used with the switch device 100 is not limited to the examples described above, and that other integrated circuits 140 with different configurations may be used as well. Also, in one or more embodiments described herein, the integrated circuit 140 may be implemented using a processor (e.g., a general purpose processor, a network processor, an ASIC processor, a FPGA processor, etc.).

In other embodiments, the switch device 100 may optionally include an additional processing unit (e.g., a processor) communicatively coupled to the processing unit 142. The additional processing unit may be used to perform additional packet processing, such as header stripping, in some embodiments. For example, in some embodiments, the additional processing unit may be configured to receive only packets with a tunnel format, such as that used in a virtualized network. In one implementation, the processing unit 142 or the integrated circuit 140 is configured to pass all packets with a tunnel format to the additional processing unit, and does not pass packets without any tunnel format (e.g., packets that are not associated with a virtualized network) to the additional processing unit. Upon receiving a packet with a tunnel format, the additional processing unit then removes one or more headers from the packet. By means of non-limiting examples, the additional processing unit may be configured to remove an outer MAC header, an outer IP header, an outer UDP header, or any combination of the foregoing, from the packet. In some embodiments, after the additional processing unit performs header stripping on the packet, the additional processing unit then passes the packet back to the integrated circuit 140. The integrated circuit 140 then transmits the packet to one or more of the instrument ports 128, 129 according to a pre-determined transmission scheme (e.g., one-to-one, one-to-many, many-to-one, many-to-many, etc.) as discussed previously. In other embodiments, in addition to performing packet stripping, the additional processing unit may also be configured to perform other packet processing functions on the received packet. In some embodiments, the additional processing unit may be located outside the housing of the switch device 100. In other embodiments, the additional processing unit may be a part of the integrated circuit 140. For example, the additional processing unit may be considered to be a part of the processing unit 142. Also, in some embodiments, the additional processing unit may be a general purpose processor, a network processor, an ASIC processor, a FPGA processor, or any of other types of processor. In other embodiments, the additional processing unit may be any hardware, software, or combination thereof.

In the illustrated embodiments, the processing unit 142 is illustrated as a component of the integrated circuit 140. In some cases, the processing unit 142 may be one or more processors in the integrated circuit 140. In other cases, the processing unit 142 may be one or more circuit components that are parts of the integrated circuit 140. In other embodiments, the processing unit 142 may be a separate component from the integrated circuit 140. The processing unit 142 may be implemented using a processor, such as a general processor, a network processor, an ASIC processor, a FPGA processor, etc. In other embodiments, the processing unit 142 may be a field processor. In further embodiments, the processing unit 142 may be a network card. The processing unit 142 may be implemented using one or more processors, wherein one or more of the processors may be considered to be a part of the switch device 100 or not. Also, in some embodiments, the integrated circuit 140 may include ternary content-addressable memory (TCAM). The integrated circuit 140 may be configured to perform various packet processing functions, included but not limited to packet filtering, packet routing, packet switching, packet mirroring, packet aggregation, etc.

As shown in the figure, the switch device 100 further includes a port 180 for receiving configuration information 182 to thereby configure the integrated circuit 140 (e.g., the processing unit 142 in the packet switch). In some embodiments, the port 180 may be a separate and different port from the network ports 112, 114. In other embodiments, the port 180 may be a network port, like the network ports 112, 114, or may be implemented using one or both of the network ports 112, 114. In such cases, in addition to receiving the information 182, the port 180 may also receive network traffic that are being communicated between nodes (e.g., nodes 160, 162). Also, in further embodiments, the switch device 100 may include multiple ports 180 for receiving configuration information 182. In some cases, one or more of the ports 180 may be used to implement the network ports 112, 114, thereby allowing the same port(s) 180 for receiving the configuration information 182 to also receive network traffic.

In the above embodiments, the switch device 100 is illustrated as having instrument ports 128, 129 for outputting packets to respective network monitoring instruments 170, 172. In other embodiments, the network device 100 may have only one instrument port for communication with only one network monitoring instrument. Also, in other embodiments, instead of outputting packets to network monitoring instruments, the instrument ports 128, 129 may be configured for outputting packets to respective media (e.g., storage devices, databases, servers, etc.).

Fabric Manager

Figure 3:
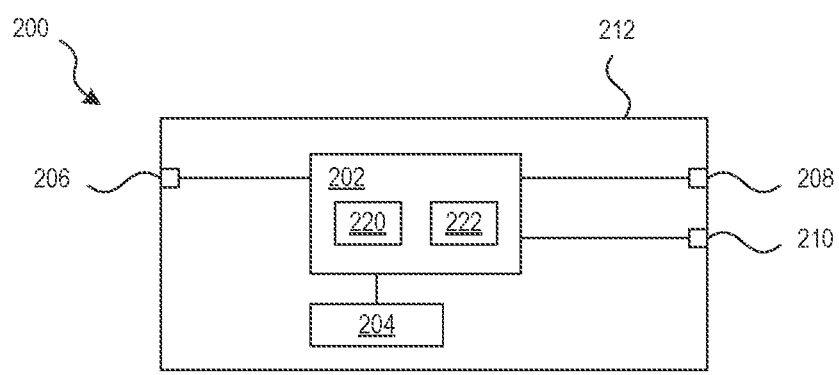
FIG. 3 illustrates an example of a fabric manager in accordance with some embodiments.

As discussed, the fabric manager 100 is configured to control the behavior of one or more nodes in the auxiliary network 10. FIG. 3 illustrates an example of a fabric manager 200 in accordance with some embodiments. The fabric manager 200 may be an example of the fabric manager 100 described with reference to FIG. 1A/1B. The fabric manager 200 includes a processing unit 202 and a non-transitory medium 204 communicatively coupled to the processing unit 202. The fabric manager 200 also includes a communication component 206 for receiving information from a user. In other cases, there may be multiple communication components 106 for receiving information from multiple users. The fabric manager 200 also includes a communication component 108 configured to communicate with a controller (e.g., the SDN controller 22), and a communication component 110 configured to communicate with one or more physical switch devices (e.g., the switch device(s) 18). Although only one communication component 208 and one communication component 210 are shown, in other examples, the fabric manager 200 may include multiple communication components 208 for communicating with multiple controllers 22, and/or multiple communication components 210 for communicating with multiple network devices 18. In the illustrated example, the processing unit 202 and the non-transitory medium 204 are accommodated in a housing 212 of the fabric manager 200. The housing 212 allows the fabric manager 200 to be carried, transported, sold, and/or operated as a single unit. Alternatively, the non-transitory medium 204 may be external to the housing 212. For example, the non-transitory medium 204 may be one or more storages/databases that are communicatively coupled to the processing unit 202. The communication components 206, 208, 210 are located at a periphery of the housing 212. In other embodiments, the communication components 206, 208, 210 may be located at other locations relative to the housing 212.

In some cases, any of the communication components 206, 208, 210 may be a port, a connector, an adaptor, or a communication device or component (such as a transceiver, etc.). Also, two or more of the communication components 206, 208, 210 may be combined and implemented in a single unit. For example, two or more of the communication components 206, 208, 210 may be a port, a connector, an adaptor, or a communication device or component (such as a transceiver, etc.).

The processing unit 202 may be implemented using an integrated circuit, such as a processor. A processor may be a general processor, a network processor, an ASIC processor, a FPGA processor, etc. In other embodiments, the processing unit 202 may be a field processor. In further embodiments, the processing unit 202 may be a network card. In some cases, the processing unit 202 may be implemented using hardware, software, or a combination of both.

As shown in the figure, the processing unit 202 includes a user interface module 220 configured to provide a user interface for allowing a user of the fabric manager 200 to enter inputs. The processing unit 202 also includes a tracking module 222 configured to track changes in the auxiliary network 10 and determine one or more network policies based on the tracked changes. Techniques for determining changes in the auxiliary network 10 and for determining one or more network policies based on the determined change will be described in further detail below.

The non-transitory medium 204 is configured to store information regarding various network components that may be parts of the auxiliary network 10. In some cases, the stored information may include identities of a plurality of service nodes representing different respective network components in the auxiliary network. For example, as shown in FIG. 1, the virtual switch 11 may be represented by a P0 node, the VM 16 may be represented by a P1 service node, and the network device 18 may be represented by a P2 service node. In other networks that include multiple virtual switches 11, there may be multiple P0 service nodes. Similarly, if the network includes multiple VMs 16 and multiple network devices 18, then the non-transitory medium 204 may store information regarding multiple P1 service nodes and P2 service nodes, respectively.

In some cases, the user interface module 220 is configured to provide a user interface for allowing a user of the fabric manager 200 to enter service node information. The created service node information may then be stored in the medium 204. By means of non-limiting examples, the service node information may include service node identity, service node category, type of network component represented by the service node, identity of network component represented by the service node, type of services provided by the network component represented by the service node, functionalities of the network component, etc., or any combination of the foregoing. In other cases, the fabric manager 200 may obtain the service node information from one or more network devices in the auxiliary network, and/or one or more network devices that are communicating with the auxiliary network.

Also, in some embodiments, the medium 204 may be configured to store one or more network policies that are for application in the auxiliary network 10. There may be one or more network policies that are associated with one or more nodes in the auxiliary network 10. For example, there may be a network policy that prescribes certain types of packets be processed by a certain virtual switch 11, a certain VM 16, and a certain switch device 18 for forwarding to certain tool(s) 20 that perform network monitoring on these packets. In another example, there may be a network policy that prescribes certain types of packets received at certain nodes in the auxiliary network 10 be dropped. In further example, there may be a network policy that prescribes certain types of packets received at certain nodes in the auxiliary network 10 be manipulated in certain way (e.g., header stripping, tagging, payload removing, insertion of information, etc.). Thus, as used in this specification, the term "network policy" may refer to any information for processing packets. By means of non-limiting examples, such information may include rule(s), criteria, prescribed action(s), etc., or any combination of the foregoing.

In some cases, the fabric manager 200 may be implemented using software that is run on a device. By means of non-limiting examples, the device may be a computer, a laptop, a server, a tablet, an iPad, a phone, a network device, or any of other devices that is capable of performing communication. When any of such devices is configured to perform any of the functions of the fabric manager described herein, any of such devices may be considered a "network device". Thus, as used in this specification, the term "network device" may refer to any device with any configuration, as long as the device is a part of the auxiliary network 10, or is configured to communicate with the auxiliary network 10 for controlling a behavior of the auxiliary network 10. Accordingly, the fabric manager 100/200 may be considered as an example of a "network device". Also, a network device may be a physical device or a virtual device. Thus, the virtual switch(s) 11 and the VM(s) 16 may be considered examples of network devices. Similarly, the physical switch device(s) 18 may also be considered an example of the network device. Also, the term "network device" may cover multiple appliances that are stacked together, or that are communicatively coupled. For example, the network device may be the fabric manager 100, and may be implemented with multiple appliances that are stacked together, or that are communicatively coupled (e.g., via cables, Internet, wireless connection, etc.). The multiple appliances may be located in a room, or in different respective geographical regions (e.g., different cities, etc.).

Policy Determination Based on a Change in the Auxiliary Network

Figure 4:
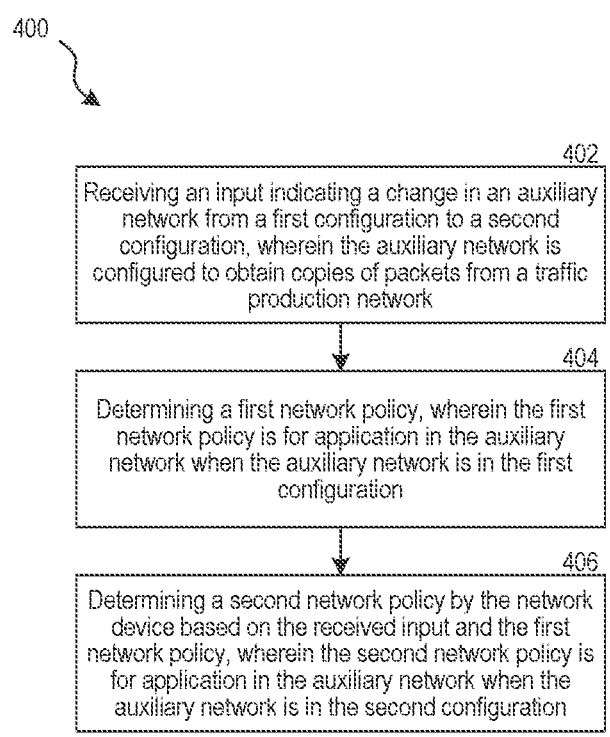
FIG. 4 illustrates a method performed by a fabric manager.

In accordance with some embodiments, the fabric manager 200 is configured to receive information regarding a change in the auxiliary network, and determine one or more network policy for application in the auxiliary network based on the detected change. FIG. 4 illustrates a method 400 performed by the fabric manager 200 of FIG. 3 in accordance with some embodiments. In other embodiments, the method 400 may be performed by other types of network devices, or other devices having different configurations as those described with reference to FIG. 3.

First, the fabric manager 200 receives an input indicating a change in an auxiliary network from a first configuration to a second configuration (item 402). The auxiliary network is configured to obtain copies of packets from a traffic production network. Accordingly, the auxiliary network is not a part of the traffic production network. In one implementation, the copies of the packets may be obtained by tapping into the traffic production network. It should be noted that the term "tapped" or any of similar terms (e.g., tap, tapping) refers to the act of obtaining packet from a network, which may be accomplished using any technique (e.g., port mirroring, tap device, etc.). In some cases, the act of receiving the input in item 402 may be performed by one or more ports at the fabric manager 200. In further cases, the act of receiving the input may be performed by the processing unit 202 (e.g., the tracking module 222 in the processing nit 202 of the fabric manager 200) in the fabric manager 200.

In some embodiments, in item 402, the input may be received from a VCENTER. For example, if there is a change in the configuration of the auxiliary network, the VCENTER may know about the change, and may transmit a signal to inform the fabric manager 200 indicating the change. In other embodiments, in item 402, the input may be received from a controller that is communicatively coupled to the fabric manager 200.

In some cases, the auxiliary network 10 may comprise a virtual machine (e.g., VM 16), and the change in the auxiliary network 10 may be a movement of the virtual machine from a first host to a second host. For example, a virtual machine implemented at a first host may be switched to a second host. In other cases, the auxiliary network 10 may comprise a vNIC, and the change in the auxiliary network 10 may be a movement of the vNIC. In other cases, the auxiliary network 10 may comprise a virtual switch (e.g., virtual switch 11) implemented at a first host, and the change in the auxiliary network 10 may be a movement of the virtual switch from the first host to a second host. In further cases, the change in the auxiliary network 10 may comprise a change in a configuration of a physical switch device (e.g., switch device 18), a change in a configuration of a VM (e.g., VM 16), a change in a configuration of a virtual switch (e.g., virtual switch 11), or any combination of the foregoing.

Next, the fabric manager 200 (e.g., the tracking module 222 in the processing nit 202 of the fabric manager 200) determines a first network policy, wherein the first network policy is for application in the auxiliary network when the auxiliary network is in the first configuration (item 404). In one implementation, after the input is received in item 402, the fabric manager 200 may determine the network device(s) that is affected by the change in the auxiliary network. For example, based on the received input, the fabric manager 200 may determine that a VM 16 implemented at a certain host 12 is affected. The fabric manager 200 also determines one of more network policy that is associated with the affected network device(s). In some cases, network policies may be stored in the medium 204, and the fabric manager 200 may look up the stored network policies to see which policy or policies are associated with the affected network device(s). For example, if there is a network policy P1 that prescribes certain packets be processed by VM 16 with identity VM1, and if the change in the auxiliary network 10 involves the VM 16 with identity VM1, then the fabric manager 200 will select that network policy P1 in item 404. In another example, if there is another network policy P2 that prescribes certain packets be processed by a physical switch device 18 with identity D1 (e.g., for forwarding to one or more tools), and if the change in the auxiliary network 10 involves the switch device D1, then the fabric manager 200 will select the network policy P2 in item 404. In some cases, a change in the auxiliary network 10 may result in one or more network policies being determined by the fabric manager 200.

Next, the fabric manager 200 (e.g., the tracking module 222 in the processing nit 202 of the fabric manager 200) determines a second network policy by the network device based on the received input and the first network policy, wherein the second network policy is for application in the auxiliary network when the auxiliary network is in the second configuration (item 406). The second network policy is for replacing the first network policy, and the second network policy is configured to achieve an objective previously desired to be achieved by the first network policy.

For example, if the received input indicates a change in the auxiliary network 10 is a switching of VM 16 with identity VM1 from host H1 to host H2, and if the network policy P1 determined in item 404 by the fabric manager 200 prescribes certain packets be processed by VM 16 with the identity VM1, then the fabric manager 200 will determine a new network policy P1' in item 406. In the above example, the new network policy P1' will prescribe the packets that would otherwise be processed by VM 16 at host H1 before the change, be processed by a VM at host 12 after the change in the auxiliary network 10.

In another example, if the change in the auxiliary network 10 is a change of a physical switch device D1 to physical switch device D2, and if the network policy P2 determined by the fabric manager 200 in item 404 prescribes certain packets be processed by the switch device D1 (e.g., for forwarding to one or more tools), then the fabric manager 200 will determine a new network policy P2' in item 406. In particular, the new network policy P2' will prescribe the packets that would otherwise be processed by the switch device D1 before the change, be processed by the physical switch device D2 after the change in the auxiliary network 10.

In some cases, the act of determining the second network policy in item 406 is performed by the fabric manager 200 automatically in response to the received input.

Also, in some cases, the second network policy may be the same as the first network policy. For example, in some cases, the fabric manager 200 may receive an input indicating a change in the auxiliary network 10. However, the change in the auxiliary network 10 may not affect any of the network devices in the auxiliary network 10 in a way to trigger a change in the existing network policies. In such scenario, the fabric manager 200 may determine the second network policy for application in the auxiliary network 10 after the change occurs to be the same as the first network policy for application in the auxiliary network 10 before the change occurs.

In some embodiments, the processing unit 202 in the fabric manager 200 may be a specialized processing unit configured to perform one or more functions described herein. For example, in some embodiments, the processing unit 202 may be configured to receive an input indicating a change in an auxiliary network from a first configuration to a second configuration, determine a first network policy for application in the auxiliary network when the auxiliary network is in the first configuration, determine a second network policy for application in the auxiliary network when the auxiliary network is in the second configuration based on the received input and the first network policy, manage one or more service nodes in the auxiliary network, or any combination of the foregoing.

In addition, in some cases, after item 406 is performed, the fabric manager 200 may deploy the determined network policy for application in the auxiliary network 10. For example, the fabric manager 200 may transmit policy information to one or more nodes in the auxiliary network 10 that are affected by the newly determined network policy (obtained in item 406), so that the one or more nodes can use the newly determined network policy to process future packets received at the node(s).

It should be noted that the processing unit 202 or the tracking module 222 therein improves existing technology. This is because the tracking module 222 allows network policy controlling behavior of one or more nodes in the auxiliary network 10 to be automatically adjusted in response to a change in the auxiliary network 10, which is believed to be not possible or not done previously. Such features are advantageous because they obviate the need to manually track changes in the auxiliary network, which can be very time consuming and labor intensive. Such features also obviate the need to manually create new network policies to address the changes in the auxiliary network, which is also very time consuming and labor intensive. Without the benefit of the above features, it may take a long time before new network policies are created and implemented for the changed auxiliary network.

In some cases, user-interface module 220 in the fabric manager 200 may be configured to generate information for display on a screen. For example, the user-interface may be configured to allow a user to input one or more criteria for determining which network devices are affected by a certain change in the auxiliary network 10. As another example, the user-interface may be configured to allow a user to input one or more criteria for selecting network policies based on the type of network device(s) affected by a change in the auxiliary network 10 and/or the type of change in the auxiliary network 10.

Also, in some cases, the user-interface module 220 may generate information in response to a command entered by a user. For example, the user may enter a request for a list of network device(s) that is affected by a certain change in the auxiliary network 10. In another example, the user may enter a request for a list of network policies (for application in the auxiliary network 10 before the change occurs) determined by the fabric manager 200 in item 404. In further example, the user may enter a request for a list of network policies (for application in the auxiliary network 10 after the change occurs) determined by the fabric manager 200 in item 406. In response to any of the above requests, the processing unit 202 (e.g., the user-interface module therein) may then retrieve the relevant information from a non-transitory medium, processes them, and then transmits the information for display on a screen. The non-transitory medium may be in the fabric manager 200, or may be external to the fabric manager 200 that is communicating with the fabric manager 200.

Stacked Switch Devices

Figure 5:
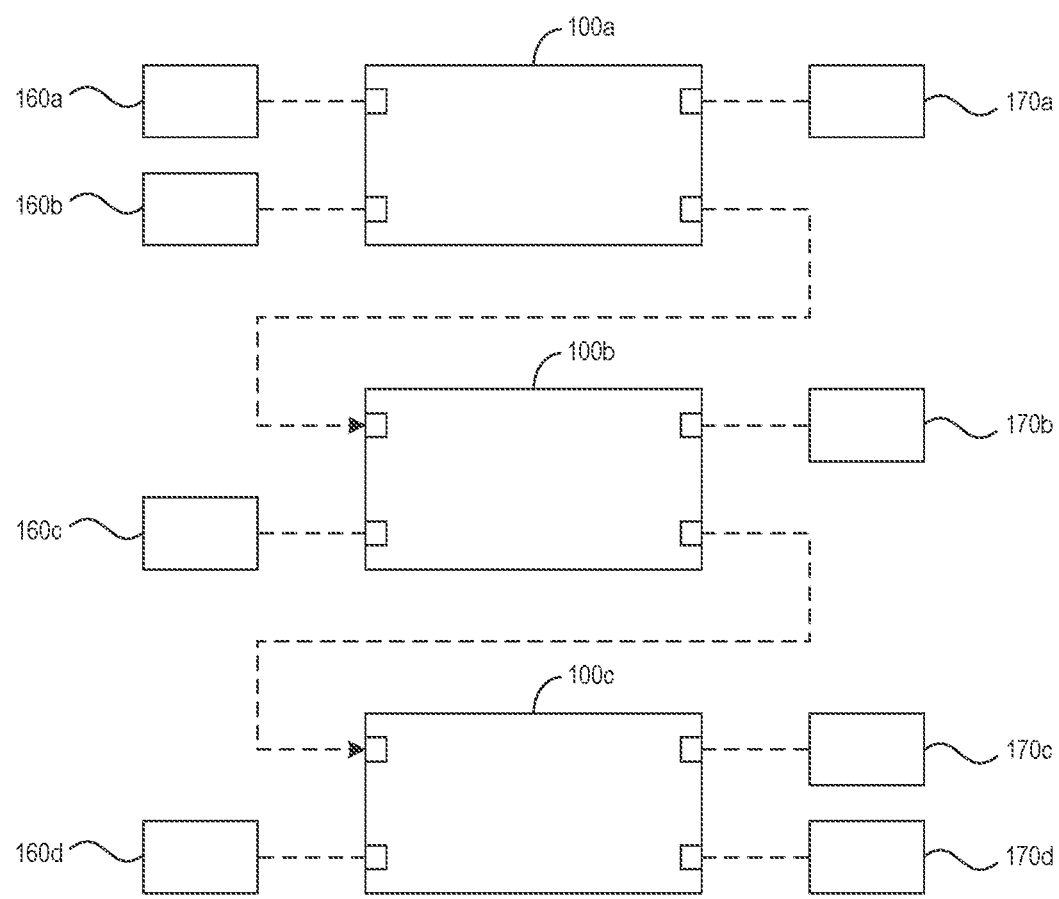
FIG. 5 illustrates a network switch device in a stacked configuration with one or more additional network switch device(s) in accordance with some embodiments.

In the above example, the switch device 100 has been illustrated as a single network appliance. In other embodiments, the switch device 100 may comprise a multiple network appliances. Thus, as used in this specification, the term "device" may refer to a single appliance/component, or to a plurality of appliances/components that are connected or communicatively coupled together. For example, in other embodiments, the method 400 may be performed by a plurality of switch devices 100 that are stacked together. Also, in some embodiments, any of the above features that is described as being performed by the network switch device may alternatively be performed by a plurality of switch devices 100 that are stacked together. FIG. 5 illustrates an example of a stacked configuration in which multiple switch devices 100a-100b are stacked together. Network switch device 100a is communicatively coupled to a network monitoring instrument 170a, and nodes 160a, 160b. Switch device 100b is communicatively coupled to a network monitoring instrument 170b, and node 160c. Switch device 100c is communicatively coupled to network monitoring instruments 170c, 170d, and node 160d. In some embodiments, the stacked switch devices 100 may be considered to be a network appliance or device itself. Accordingly, as used in this specification, the term "network switch device" may refer to a single network appliance, or multiple network appliances.

Deployment of Switch Device

Figure 6:
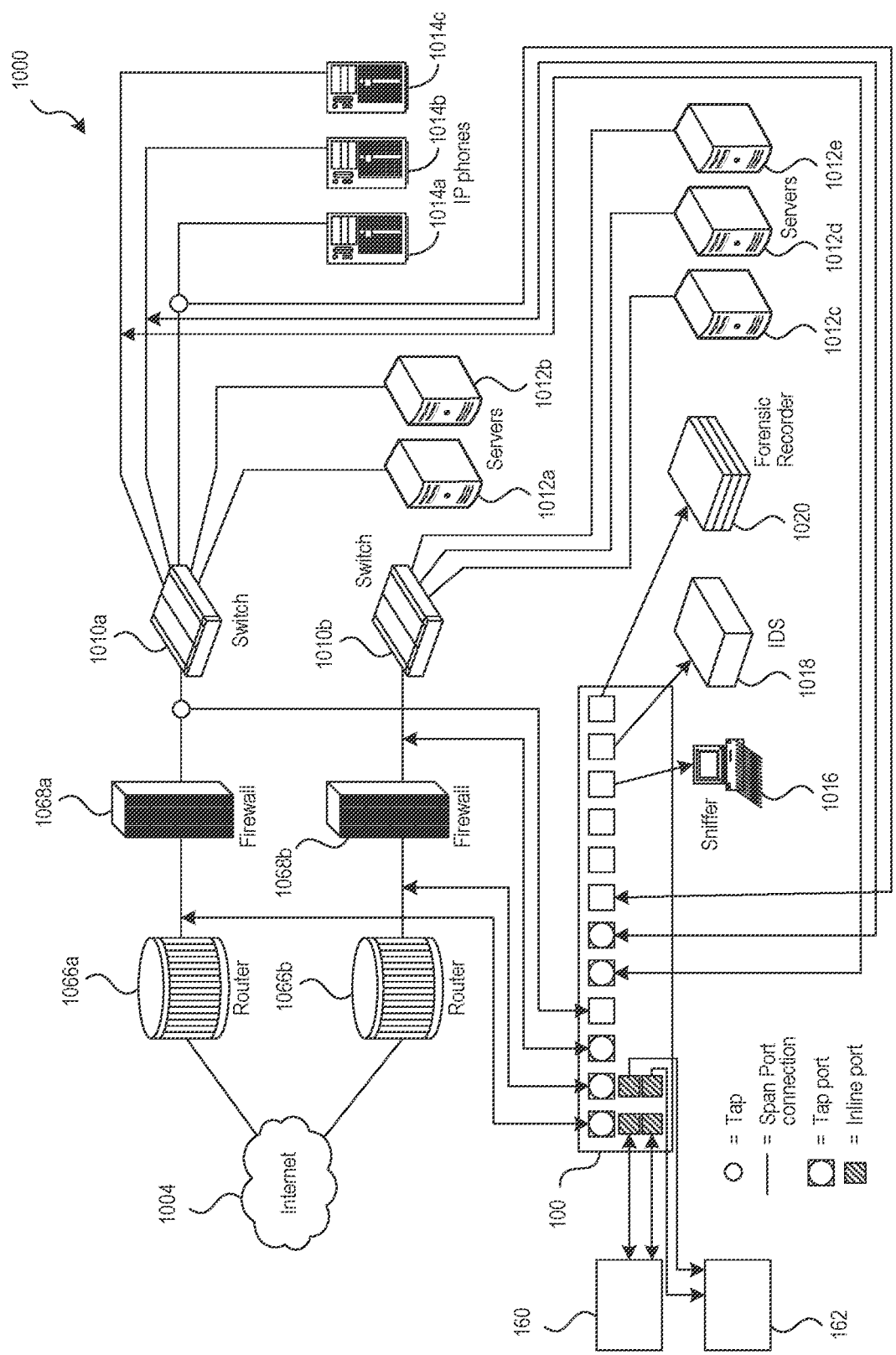
FIG. 6 illustrates a deployment of a network switch device in accordance with some embodiments.

FIG. 6 shows the deployment of the network switch device 100 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the network switch device 100. As illustrated in FIG. 6, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the network switch device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function.

In some embodiments, when using the network switch device 100, one or more non-pass through instruments (such as IDS, sniffer, forensic recorder, etc.) may be connected to instrument port(s), and one or more pass through instruments (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the network switch device 100, the network switch device 100 can compare whether the IDS or the IPS sees more threats, and/or can have a redundant protection such that if the IPS misses any threat, the IDS may pick it up.

Specialized Computer System Architecture

Figure 7:
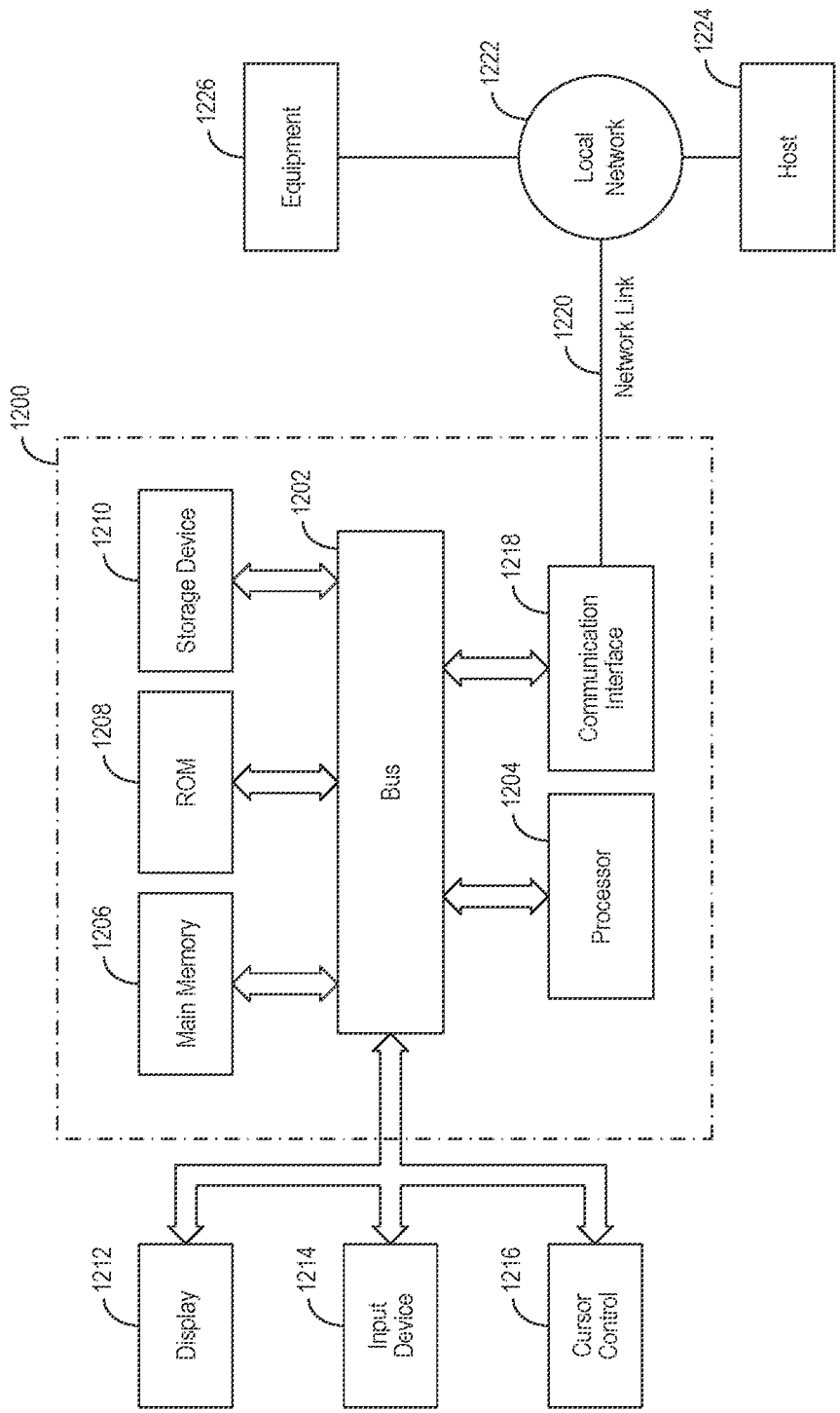
FIG. 7 illustrates an example of a specialized computer system with which embodiments described herein may be implemented.

FIG. 7 is a block diagram that illustrates an embodiment of a specialized computer system 1200 upon which embodiments described herein may be implemented. For example, in some embodiments, the specialized computer system 1200 may be used to implement one or more functions of the processing unit 242 described herein. Computer system 1200 includes a bus 1202 or other communication mechanism for communicating information, and a specialized processor 1204 coupled with the bus 1202 for processing information. The specialized processor 1204 may be used to perform various functions described herein. For example, in some embodiments, the specialized processor 1204 may be configured to receive an input indicating a change in an auxiliary network from a first configuration to a second configuration, determine a first network policy for application in the auxiliary network when the auxiliary network is in the first configuration, determine a second network policy for application in the auxiliary network when the auxiliary network is in the second configuration based on the received input and the first network policy, manage one or more service nodes in the auxiliary network, or any combination of the foregoing.

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it. Also, a "packet" may refer to any part of a packet. For example, a "packet" may be a header of a packet, a payload of a packet, or both.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method performed by a network device, the method comprising:
   receiving, by the network device, an input signal including an indication of a change in a configuration of a first network from a first configuration to a second configuration, wherein the first network comprises a virtual network interface card, and the change in the configuration of the first network comprises a movement of the virtual network interface card, wherein the network device comprises a fabric manager configured to manage a node in the first network, and wherein the first network is configured to obtain copies of traffic packets from a second network;
   determining, by the network device, a first network policy including at least one of a rule or a criterion that prescribes a first type of packet of the traffic packets for processing in accordance with a first network objective, and is for application to the copies of traffic packets when the first network is in the first configuration;
   determining, by the network device, a second network policy that is independent of the first network policy, prescribes a second type of packet of the traffic packets for processing in accordance with a second network objective, and is for application to the copies of traffic packets when the first network is in the second configuration; and
   deploying, by the network device, the second network policy for application on the copies of traffic packets in the first network such that the network device automatically applies a modification of the at least one of a rule or a criterion for processing the copies of traffic packets by the first network in accordance with the second network objective as a result of the change in the configuration of the first network.

2. The method of claim 1, wherein the input signal is received from a device other than the network device.

3. The method of claim 1, wherein the first network is an auxiliary network and the second network is a traffic production network.

4. The method of claim 1, wherein the detected change is in a configuration of a node of the first network, the node being at a boundary between the first network and the second network.

5. The method of claim 1, wherein the second network objective is distinct from the first network objective and is based on the change in the configuration of a node of the first network as indicated in the input signal.

6. The method of claim 1, wherein the second network policy is for replacing the first network policy and the second network policy is configured to achieve an objective previously desired to be achieved by the first network policy.

7. The method of claim 1, wherein the first network policy prescribes the copies of traffic packets to be forwarded to an instrument port for transmission to a network monitoring instrument.

8. The method of claim 1, wherein the input signal is received from a virtual machine management layer.

9. The method of claim 1, wherein the input signal is received from a controller that is communicatively coupled to the network device.

10. The method of claim 1, wherein the first network further comprises a virtual machine, and the change in the configuration of the first network further comprises a movement of the virtual machine from a first host to a second host.

11. The method of claim 1, wherein the change in the configuration of the first network further comprises a change in a configuration of a physical switch device in the first network.

12. The method of claim 1, wherein the network device is implemented in a computer, a laptop, a server, a tablet computer, or a phone.

13. The method of claim 1, wherein the network device comprises multiple appliances that are stacked together or that are communicatively coupled.

14. The method of claim 1, wherein at least one of the first type of packet or the second type of packet defines for processing by a particular virtual switch, a particular virtual machine, or a particular switch device configured to forward packets to a tool that monitors any packet of the first type of packet or the second type of packet.

15. The method of claim 1, wherein at least one of the first type of packet or the second type of packet defines a type of packet received by a node of the first network and causes any matching packet to be dropped.

16. The method of claim 1, wherein at least one of the first type of packet or the second type of packet defines a type of packet received by a node of the first network, and causes header stripping, tagging, payload removal, or insertion of information in any matching packet.

17. A network device comprising:
   a communication interface for receiving an input signal including an indication of a change in a configuration of a first network from a first configuration to a second configuration; wherein the first network comprises a virtual network interface card, and the change in the configuration of the first network comprises a movement of the virtual network interface card, wherein the network device comprises a fabric manager configured to manage a node in the first network, and wherein the first network is configured to obtain copies of traffic packets from a second network;

a processor implemented in hardware coupled to the communication interface; and a non-transitory computer-readable memory containing instructions that, when executed by the processor, cause the network device to:

determine a first network policy including at least one of a rue or a criterion that prescribes a first type of packet of the traffic packets for processing in accordance with a first network objective, and is for application to the copies of traffic packets when the first network is in the first configuration;

determine a second network policy that is independent of the first network policy, prescribes a second type of packet of the traffic packets for processing in accordance with a second network objective, and is for application to the copies of traffic packets when the first network is in the second configuration; and deploy the second network policy for application on the copies of traffic packets in the first network such that the network device automatically adjusts the at least one of a rule or a criterion for processing the copies of traffic packets by the first network in accordance with the second network objective as a result of the change in the configuration of the first network.

18. A computer product having a non-transitory medium storing a set of instructions, an execution of which by a processor in a network device causes a method to be performed, the method comprising:

receiving, by the network device, an input signal including an indication of a change in a configuration of a first network from a first configuration to a second configuration, wherein the first network comprises a virtual network interface card, and the change in the configuration of the first network comprises a movement of the virtual network interface card, wherein the network device comprises a fabric manager configured to manage a node in the first network, and wherein the first network is configured to obtain copies of traffic packets from a second network;

determining, by the network device, a first network policy including at least one of a rule or a criterion that prescribes a first type of packet of the traffic packets for processing in accordance with a first network objective, and is for application to the copies of traffic packets when the first network is in the first configuration;

determining, by the network device, a second network policy that is independent of the first network policy, prescribes a second type of packet of the traffic packets for processing in accordance with a second network objective, and is for application to the copies of traffic packets when the first network is in the second configuration; and deploying, by the network device, the second network policy for application on the copies of traffic packets in the first network such that the network device automatically applies an adjusted version of the at least one of a rule or a criterion for processing the copies of traffic packets by the first network in accordance with the second network objective as a result of the change in the configuration of the first network.

* * * * *